United States Patent [19]

Kato et al.

[11] 4,147,830

[45] Apr. 3, 1979

[54] RECORDING SHEET

[75] Inventors: Hajime Kato; Akira Igarashi; Hiroharu Matsukawa; Akio Miyamoto, all of Fujimiya, Japan

[73] Assignee: Fuji Photo Film Co., Ltd., Minami-ashigara, Japan

[21] Appl. No.: 761,030

[22] Filed: Jan. 21, 1977

[30] Foreign Application Priority Data

| | | | |
|---|---|---|---|
| Jan. 28, 1976 | [JP] | Japan | 51-8229 |
| Feb. 3, 1976 | [JP] | Japan | 51-10544 |
| Feb. 5, 1976 | [JP] | Japan | 51-11729 |
| Feb. 9, 1976 | [JP] | Japan | 51-12935 |

[51] Int. Cl.$^2$ .......................... B32B 5/16; B32B 19/00

[52] U.S. Cl. .................................... 428/324; 282/27.5; 427/150; 427/151; 427/261; 428/307; 428/325; 428/327; 428/328; 428/330; 428/914

[58] Field of Search ............... 428/325, 327, 307, 328, 428/914, 913, 330, 324; 282/27.5; 427/261, 150, 151, 146

[56] References Cited

U.S. PATENT DOCUMENTS 3,856,551 12/1974 Jenkins ................................ 428/327

*Primary Examiner*—Thomas J. Herbert, Jr.

*Attorney, Agent, or Firm*—Sughrue, Rothwell, Mion, Zinn and Macpeak

[57] ABSTRACT

A recording sheet comprising a support having thereon a layer of a color developer capable of forming a developed color image in the presence of a color former, wherein the color developer layer contains (1) a dimer of a compound of the formula (I):

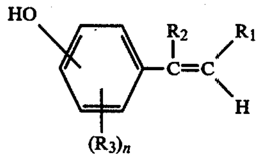

(I)

wherein $R_1$, $R_2$ and $R_3$, which may be the same or different, each represents a hydrogen atom, an alkyl group, an aryl group or an aralkyl group, and n is an integer of 1 to 4, as a color developer, and (2) an oil adsorptive inorganic pigment.

14 Claims, No Drawings

RECORDING SHEET

BACKGROUND OF THE INVENTION

1. Field of the Invention

The present invention relates to a recording sheet, more precisely, to a novel recording sheet having a color developer layer capable of reacting with a color former to form a developed color image.

2. Description of the Prior Art

Recording sheets are, in general, well known where a developed color image is formed by a so-called color forming reaction of a substantially colorless electron donating organic compound capable of forming a color (hereinafter referred to as a "color former") on contact with an electron accepting solid acid (hereinafter referred to as a "color developer"). Examples of color developers are clay substances such as terra alba, activated clay, attapulgite, zeolite, bentonite and kaolin; organic acids such as succinic acid, tannic acid, gallic acid, alkyl substituted phenols and bisphenol A; metal salts of aromatic carboxylic acids such as zinc salts and aluminum salts of alkyl substituted salicylic acids; and acid polymers such as p-phenylphenol/formaldehyde resins. The term "color former" as used hereinafter means an electron donating or proton (for example, from an acid) accepting material capable of forming a color image, and the term "color developer" as used hereinafter means an electron accepting or proton donating material.

Recording sheets where these phenomena are specifically used include pressure-sensitive copying papers (for example, as disclosed in U.S. Pat. Nos. 2,505,470, 2,505,489, 2,550,471, 2,548,366, 2,712,507, 2,730,456, 2,730,457 and 3,418,250) and heat-sensitive recording papers (for example, as disclosed in Japanese Patent Publication No. 4160/68 and U.S. Pat. No. 2,939,009). Heat-sensitive recording papers are obtained by coating a color former and a color developer on a support together with a heat fusible substance such as acetanilide. A heat fusible substance means a substance capable of melting on heating to dissolve a color former. Color developers having a low melting point themselves may be used without a heat fusible substance.

Another printing method is known where an ink containing a color former is supplied to a color developer coated sheet through a medium such as stencil to obtain a developed color image (for example, as disclosed in German Patent Application (OLS) No. 1,939,624).

The recording using above-described phenomena requires a physical stimulus such as application of a pressure with a ball-point pen or a typewriter or heating with a heating element or an electric current, etc.

The most typical embodiment of a recording sheet is a pressure-sensitive copying paper, which is prepared by dissolving a color former in a solvent such as an alkylated naphthalene, alkylated diphenylmethane, alkylated diphenyl, terphenyl or chlorinated paraffin, dispersing the resulting solution in a binder or encapsulating the resulting solution in microcapsules, and then coating such on a support such as paper, a plastic sheet or a resin coated paper. On the other hand, where a color developer is dissolved in a solvent such as an organic solvent, the color developer solution in situ penetrates into a support, or after being dissolved or dispersed in a medium together with a binder, this is coated on a support. In general, color former and color developer are coated on the same surface or opposite surfaces of a support or on different supports.

Some problems which occur with these conventional color developer coated sheets need to be improved. More precisely, where clay substances such as activated clay are used as a color developer, the developed color image (for example, Crystal Violet formed from crystal violet lactone as a color former) fades away on contact with polar solvents such as water or glycols, which is a disadvantage.

In addition, where phenol resins such as p-phenylphenolformaldehyde resin are used as a color developer, a yellowing of the surface to be developed easily occurs due to the effects of light, which is also a defect. Moreover, aldehydes such as formaldehyde are used in the synthesis of phenol resins and the use of highly toxic formaldehyde results in various difficulties occurring during the synthesis steps and is not preferred. Where phenol compounds such as alkyl substituted phenols and bisphenol A are used as a color developer, these compounds tend to sublime or diffuse in a support with the lapse of time, and as a result, the color developability gradually decreases, which is a disadvantage. In addition, the use of alkyl substituted phenols and bisphenol A is not preferred because the initial color developability is low. These defects greatly affect the product value and it is desired to improve these problems.

It was previously found that dimers of compounds of the following formula (I) (hereinafter referred to as alkenyl phenols) were effective as a color developer for recording sheets:

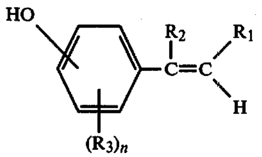

(I)

wherein $R_1$, $R_2$ and $R_3$ each represents a hydrogen atom, an alkyl group, an aryl group or an aralkyl group, and n is an integer of 1 to 4. The use of the above-described alkenyl phenol dimers results in a substantial improvement in various properties of the color developer. However, the color developability of the coated layer and the film surface strength are still not sufficient, and improvements must further be made.

SUMMARY OF THE INVENTION

Accordingly, an object of this invention is to provide recording sheets having improved color developability and film surface strength.

Another object of this invention is to improve the coating properties of coating solutions in the preparation of recording sheets having improved color developability and film surface strength.

It has now been found that the incorporation of an oil adsorptive inorganic pigment in a color developer layer of a recording sheet containing a dimer of an alkenyl phenol of the above formula (I) satisfies the above objects.

Accordingly, this invention provides a recording sheet comprising a support having thereon a layer of a color developer capable of forming a developed color image in the presence of a color former wherein the layer of the color developer contains (1) a dimer of a compound of the formula (I):

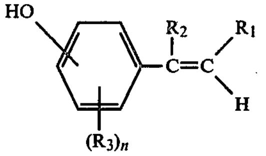

(I)

wherein $R_1$, $R_2$ and $R_3$, which may be the same or different, each represents a hydrogen atom, an alkyl group, an aryl group or an aralkyl group, and n is an integer of 1 to 4, as a color developer; and (2) an oil adsorptive inorganic pigment.

DETAILED DESCRIPTION OF THE INVENTION

In the above formula (I), $R_1$, $R_2$ and $R_3$ each represents a hydrogen atom, an alkyl group (preferably $C_1$ to $C_{18}$, more preferably $C_1$ to $C_{12}$), an aryl group or an aralkyl group (wherein the alkyl moiety is preferably $C_1$ to $C_{18}$, more preferably $C_1$ to $C_{12}$), and n is an integer of 1 to 4, and the hydroxyl group may be in the m- or p-position to the

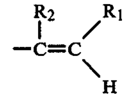

moiety and is most preferably in the p-position.

Compounds of the above formula (I) can be synthesized, for example, in accordance with the following reaction schematic:

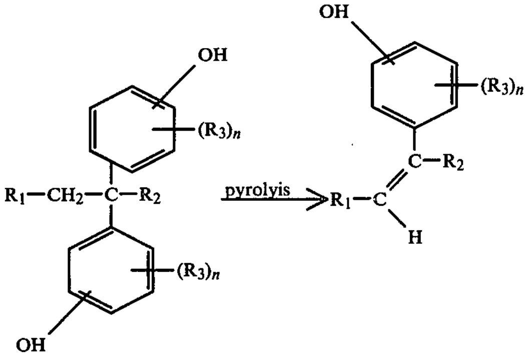

(II) (dihydroxydiaryl alkanes) (I) (alkenyl phenols)

dimerization mainly dimers (containg monomer and oligomers of trimers or higher)

The pyrolysis can be carried out as follows: The starting compound of the formula (II) is subjected to a pyrolysis at a temperature of about 80° C. to about 150° C., preferably 110° C. to 140° C., in the presence of a basic catalyst such as an oxide, hydroxide, alcoholate or phenolate of an alkali metal (e.g., Na, Ka, Li, etc.) or alkaline earth metal (e.g., Mg, Ca, etc.) and in the absence of water to obtain the compound of the formula (I). Suitable examples of these materials include oxides such as magnesium oxide and calcium oxide, hydroxides such as magnesium hydroxide and calcium hydroxide, alcoholates such as sodium ethoxide, sodium methoxide, potassium ethoxide, potassium methoxide, lithium ethoxide, and lithium methoxide, and phenolates such as sodium phenolates, potassium phenolates and lithium phenolates. The dimerization can be carried out by heating at least one compound of the formula (I) at about 15° to about 130° C. These procedures are described in detail in Japanese Patent Application (OPI) No. 30852/75 and British Pat. No. 903,062.

In the synthesis as described above, the dimer of the alkenyl phenol of the formula (I) above is predominantly formed, however, some amount of trimer or higher oligomers are also formed and some amount of monomer, i.e., alkenyl phenol per se, remains. The color developer can be a dimer of the alkenyl phenol or a composition containing such along with unreacted monomer and trimer or higher oligomers and such is suitable as a color developer for use in this invention if the amount of dimer present is about 70 to 90% by weight, the amount of monomer is about 15% by weight or less, (i.e., about 0 to 15% by weight) and the amount of trimer or higher oligomers is about 25% weight or less generally ranging from about 5 to about 25% by weight.

As described above, alkenyl phenol dimers as used in the present invention can be synthesized more safely and easily than phenol resins.

Examples of alkenyl phenols of the formula (I) which can be used to form the dimers used in this invention include p-isopropenyl-phenol, 2-(p-hydroxyphenyl)-2-butene, 2-(p-hydroxyphenyl)-2-pentene, α-(p-hydroxyphenyl)styrene, 1-(p-hydroxyphenyl)-1-isobutene, p-cyclohexenylphenol, 2-(p-hydroxyphenyl)-3-methyl-2-butene, 2-(p-hydroxyphenyl)-2-hexene, 2-(p-hydroxyphenyl)-2-hexadecene, m-methyl-p-isopropenyl-phenol, 2-(o-isopropyl-p-hydroxyphenyl)-2-butene, 2-(o-phenyl-p-hydroxyphenyl)-2-pentene, 2-(o-tert-butyl-p-hydroxyphenyl)-2-pentene, m-isopropenylphenol and 1-(p-hydroxyphenyl)-1-propylene.

Oil adsorptive inorganic pigments, e.g., those capable of adsorbing an oil as used in the present invention include clay minerals such as kaolin, talc, bentonite, terra alba, activated clay, agalmatolite, mica and zeolite; and metal oxides such as zinc oxide, titanium oxide and alumina; and silicates other than clay substances such as silicic acid anhydride, aluminum silicate and zinc silicate. Of these inorganic pigments, clay minerals are more effective in the present invention since they have a higher oil adsorptivity, and in particular, kaolin, talc, agalmatolite and activated clay are most effective.

The particle size of the oil adsorptive inorganic pigments to be used in the present invention preferably can be that of pigments having an average particle diameter of about 40μ or less, particularly 1 to 20μ, more particularly 2 to 10μ, are preferable. In this preferred range, the evenness of the color developer coated surface is excellent and recording sheets having a high product value can be obtained.

The amount of oil adsorptive inorganic pigment to be used is preferably about 10 to 100,000 parts by weight, particularly 50 to 10,000 parts by weight, more particularly 100 to 5,000 parts by weight, per 100 parts by weight of alkenyl phenol dimer.

The essential elements of the recording sheets of the present invention are a support and a color developer layer which is coated on the support and which contains at least one alkenyl phenol dimer and at least one oil adsorptive inorganic pigment, and therefore, any and all techniques known in this field can be adopted and used in the present invention. More precisely, the color developer of the present invention can be provided on the same surface on which a color former is provided or on opposite surfaces of a support, or the color developer and the color former can be provided on different supports. In addition, the color developer of this invention can be stored in the form of an ink and can be coated or printed on a support when needed.

It is particularly preferred, because of the effects obtained, to incorporate a phenol resin (novolak type) and/or a metal salt of an aromatic carboxylic acid in a color developer layer of this invention, which is specifically illustrated in the Examples which follow.

Any conventional proton donating phenol resin can be used, and, for example, phenol-aldehyde polymers (so-called novolak type) and phenol-acetylene polymers can be used.

Examples of these phenol polymers are as follows: p-phenylphenol-formaldehyde polymer, p-fluorophenol-formaldehyde polymer, p-chlorophenol-formaldehyde polymer, p-bromophenol-formaldehyde polymer, p-iodophenol-formaldehyde polymer, p-nitrophenol-formaldehyde polymer, p-carboxyphenol-formaldehyde polymer, o-carboxyphenol-formaldehyde polymer, p-carboalkoxyphenol-formaldehyde polymer, p-aroylphenol-formaldehyde polymer, p-lower alkoxyphenol-formaldehyde polymer; copolymers of p-alkyl($C_1$ to $C_{12}$)phenols (such as p-methylphenol, p-ethylphenol, p-n-propylphenol, p-isopropylphenol, p-n-amylphenol, p-isoamylphenol, p-cyclohexylphenol, p-1,1-dimethyl-n-propylphenol, p-n-hexylphenol, p-isohexylphenol, p-1,1-dimethyl-n-butylphenol, p-1,2-dimethyl-n-butylphenol, p-n-heptylphenol, p-isoheptylphenol, p-5,5-dimethyl-n-amylphenol, p-1,1-dimethyl-n-amylphenol, p-n-octylphenol, p-1,1,3,3-tetramethylbutylphenol, p-isooctylphenol, p-n-nonylphenol, p-isononylphenol, p-1,1,3,3-tetramethylamylphenol, p-n-decylphenol, p-isodecylphenol, p-n-undecylphenol, p-isoundecylphenol, p-n-dodecylphenol) with formaldehyde; copolymers of isomers of these p-alkyl($C_1$ to $C_{12}$)phenols with formaldehyde; and copolymers of mixtures containing two or more of these alkyl phenols and isomers thereof with formaldehyde. A suitable polymerization degree is about 2 to about 20, preferably 3 to 10. These p-substituted phenols can be additionally substituted with a substituent in the meta position, and such m- and p-substituted phenols behave in a similar way to the above-described p-substituted phenols. In any event, m-substituents are not very significant. Where phenol resins are used in the present invention, the amount of the phenol resin to be added is about 0.001 to about 30 parts by weight, preferably 0.05 to 2 parts by weight, to 1 part by weight of an alkenyl phenol dimer.

Examples of metal salts of aromatic carboxylic acids include copper, lead, magnesium, calcium, zinc, aluminum, tin and nickel salts of aromatic carboxylic acids. Typical examples of aromatic carboxylic acids are benzoic acid, chloro-benzoic acid (o-, m-, p-), nitro-benzoic acid (o-, m-, p-), toluic acid (o-, m-, p-), 4-methyl-3-nitro-benzoic acid, 2-chloro-4-nitro-benzoic acid, 2,3-dichloro-benzoic acid, 2,4-dichloro-benzoic acid, p-isopropyl-benzoic acid, 2,5-dinitro-benzoic acid, p-tert-butyl-benzoic acid, N-phenyl-anthranilic acid, 4-methyl-3-nitro-benzoic acid, salicylic acid, m-hydroxy-benzoic acid, p-hydroxy-benzoic acid, 3,5-dinitro-salicylic acid, 5-tert-butyl-salicylic acid, 3-phenyl-salicylic acid, 3-methyl-5-tert-butyl-salicylic acid, 3,5-di-tert-butyl-salicylic acid, 3,5-di-tert-amyl-salicylic acid, 3-cyclohexyl-salicylic acid, 5-cyclohexyl-salicylic acid, 3-methyl-5-isoamyl-salicylic acid, 5-isoamyl-salicylic acid, 3,5-di-sec-butyl-salicylic acid, 5-nonyl-salicylic acid, 2-hydroxy-3-methyl-benzoic acid, 2-hydroxy-5-tert-butyl-benzoic acid, 2,4-cresotinic acid, 5,5-methylene-disaicylic acid, acetoamino-benzoic acid (o-, m-, p-), 2,4-dihydroxy-benzoic acid, 2,5-dihydroxy-benzoic acid, anacardic acid, 1-naphthoic acid, 2-naphthoic acid, 1-hydroxy-2-naphthoic acid, 2-hydroxy-3-naphthoic acid, 2-hydroxy-1-naphthoic acid, 3-phenyl-5-($\alpha$,$\alpha$-dimethylbenzyl)salicylic acid, 3,5-di($\alpha$-methylbenzyl)salicylic acid, thiosalicylic acid and 2-carboxybenzaldehyde.

Where metal salts of aromatic carboxylic acids are used in the present invention, the amount of the metal salt to be added is about 0.01 to about 30 parts by weight, preferably 0.05 to 2 parts by weight, to 1 part by weight of the alkenyl phenol dimer. Preferred metal salts of aromatic carboxylic acids are those having a hydroxy group in the ortho position.

The alkenyl phenol dimers as used in this invention can also be used with basic compounds in order to achieve a further advantageous result. Examples of suitable basic compounds are alkali metal compounds such as sodium hydroxide and potassium hydroxide, and alkaline earth metal compounds such as magnesium hydroxide, magnesium oxide, magnesium carbonate, calcium hydroxide and calcium carbonate. Of these basic compounds, sodium, potassium and magnesium compounds, particularly magnesium compounds, are more effective. In particular, magnesium oxide is the most effective. The amount of the basic compound to be added is preferably about 1 to about 5,000 parts by weight, particularly 2 to 1,000 parts by weight, more particularly 5 to 500 parts by weight, to 100 parts by weight of the alkenyl phenol dimer.

It has also been found that certain types of metal salts function in the color developer layer of this invention in a manner similar to that of the aromatic carboxylic acid salts described above and addition thereof to the color developer layer results in an increase in the light resistance of the developed color image. Examples of these metal salts are copper, aluminum, manganese, nickel, zinc, cobalt and iron salts, for instance, inorganic acid salts such as the sulfates, hydrochlorides, nitrates and phosphates and organic acid salts such as the acetates and oxalates. The amount of these metal salts to be added is about 0.1 part by weight or more, preferably 0.5 to 100 parts by weight, to 100 parts by weight of the alkenyl phenol dimer.

The color developer sheets of this invention can be prepared by coating a dimer of a compound of the above-described formula (I) (this may contain monomer and trimer or higher oligomers as described previously) and an oil adsorptive inorganic pigment and, if desired, a phenol resin, a metal salt of an aromatic carboxylic acid and/or a basic compound, on a support, if desired, together with a binder, with the coating components being dissolved or dispersed in an organic solvent before coating. An appropriate amount of additives which are generally used in this field, for example, an anti-foaming agent such as silicone oil and octyl alcohol can be used in the preparation of color developer sheets of this invention without decreasing the effect of this invention, generally up to about 10% by weight based on the weight of the color developer layer composition.

Examples of organic solvents which can be used for dissolving the components of color developer layer of this invention include alcohols such as methanol, ethanol and butanol; esters such as ethyl acetate, butyl acetate, ethyl lactate, n-butyl lactate, ethyl hydroxyacetate, n-butyl-$\beta$-oxypropionate, isobutyl-$\beta$-oxypropionate, n-propyl-$\beta$-oxypropionate, methyl-$\alpha$-hydroxy-isobutyrate, and ethyl-$\alpha$-hydroxy-n-butyrate; ketones such as acetone, methyl ethyl ketone and methyl isobutyl ketone; and hydrocarbons such as benzene, toluene and xylene.

Binders which can be used in this invention include methyl polymethacrylate, polyacrylates, polyvinyl acetate, vinyl acetate-vinyl chloride copolymers, polyvinyl butyral, polystyrene, linear saturated polyester resins, ethyl cellulose, cellulose acetate and nitrocellulose. The thus prepared color developer solution or dispersion is coated on a support such as paper, a plastic sheet such as polyethylene terephthalate or a resin coated sheet such as polyethylene coated paper.

On the other hand, the color developer components of this invention can be processed in an aqueous system as follows: An alkenyl phenol dimer and, if desired, a phenol resin and/or a metal salt of an aromatic carboxylic acid are pulverized to fine powders and dispersed in water or dissolved in an organic solvent which is not compatible with water selected from the above-described organic solvents (such as ethyl acetate or benzene) and then emulsified in water, or an aromatic carboxylic acid and an alkenyl phenol dimer are dissolved in an alkali metal hydroxide aqueous solution and then a metal compound such as a copper, aluminum, zinc, tin or nickel compound is added thereto and reacted. In this aqueous system, the joint use of a water dispersed emulsion of an oily substance brings about an improvement of developability and developing speed of the resultant recording sheet. The oily substance which is used is a hydrophobic substance which is liquid at normal temperature (e.g., about 20°-30° C.) including vegetable oils, animal oils, mineral oils, synthetic oils and hydrophobic organic solvents. Examples of these oily substances are vegetable oils such as olive oil, castor oil, cotton seed oil, soybean oil, lemon oil, corn oil, sesame oil and rice bran oil; animal oils such as fish oil and whale oil; mineral oils obtained mainly from petroleum such as paraffins, kerosene and petroleum naphtha; synthetic oils such as alkylated naphthalenes, alkylated diphenyls, alkylated diphenylmethanes, octyl diphthalate, silicone oil, fluorine oil and octyl p-hydroxybenzoate; and hydrocarbons and chlorinated derivatives thereof such as benzene, toluene, xylene and chlorobenzene. Paraffins and synthetic oils are preferred.

A water-soluble natural high molecular weight compound such as a protein (e.g., gelatin, albumin and casein, etc.), a cellulose (e.g., carboxymethyl cellulose and hydroxyethyl cellulose, etc.) or a saccharose (e.g., agar, sodium alginate, carboxymethyl starch and gum arabic, etc.); a water-soluble synthetic high molecular weight compound such as polyvinyl alcohol, polyvinyl pyrrolidone, polyacrylic acid or polyacrylamide, etc.; or a latex such as an acrylate copolymer latex, a vinyl acetate latex or a styrene-butadiene copolymer latex is added to the thus prepared color developer aqueous dispersion as a binder. The amount of the above-described binder to be used is preferably about 1 to about 50 parts by weight, more preferably 5 to 40 parts by weight, most preferably 10 to 30 parts by weight, to 100 parts by weight of the solid components (color developer and inorganic pigment). If the amount of the binder used is too small, sufficient film surface strength cannot be obtained, and if the amount of the binder is too large, the developability decreases and the manufacturing cost is high.

In the preparation of a coating solution containing an alkenyl phenol dimer, if the viscosity of the coating solution increases too much or flocculation of the alkenyl phenol dimer occurs to form agglomerates and, as a result, the developability and the film surface strength of the color developer layer ultimately formed are not sufficient, it is desirable to add a surface active agent to the color developer coating solution. Examples of suitable surface active agents which can be used in this invention are anionic surface active agents such as Turkey red oil, alkyl sulfoacetate salts, higher alcohol sulfate salts, alkylbenzene sulfonate salts, alkylsulfonate salts, soaps, alkylaryl sulfonic acid salts, dialkyl sulfosuccinic acid salts, alkyl naphthalene sulfonic acid salts, higher alcohol phosphate salts, naphthalene sulfonic acid salt-formaldehyde condensation products, polyoxyethylene-alkyl sulfonic acid salts, dialkyl sulfuric acid salts, sulfated olefin salts and sulfated fatty acid ester salts; cationic surface active agents such as tertiary amines and ethanolamine ester salts; nonionic surface active agents such as glycerin mono-fatty acid esters and saccharide fatty acid esters; and mixtures of these compounds. Anionic surface active agents are especially effective, and in particular, alkylenbenzene sulfonic acid salts, higher alcohol sulfate salts, naphthalene sulfonic acid salt-formaldehyde condensation products and alkylnaphthalene sulfonic acid salts are preferred. The actual chemical structures of the above-described surface active agents are not generally well-known, but these are easily commercially available. A suitable amount of the surface active agent to be used is about 0.5 part by weight or more preferably 1 to 20 parts by weight, to 100 parts by weight of the alkenyl phenol dimer.

The thus prepared coating solution can be coated on a support as follows: Where an organic solvent is used as a medium, a printing coating method such as a flexographic printing or gravure printing method is suitable. In an aqueous system coating solution where water is used as a medium, and and all conventional methods which are well known in this field can be used including air-knife coating, roll coating, blade coating or size-press coating. The amount of the coating solution to be coated on a support is about 0.1 to about 10 $g/m^2$ (on a solids basis), preferably 0.2 to 8 $g/m^2$, more preferably 0.3 to 7 $g/m^2$. If the coating amount is lower than about 0.1 $g/m^2$, the developability is not sufficient, and the upper limit is determined mainly by economic reasons rather than the properties of the products obtained.

The color formers which react with color developers used in the recording sheets of this invention are not specifically limited. Suitable examples of color formers are described in U.S. Pat. Nos. 2,548,365, 2,548,366, 3,293,060, 3,551,181, 3,506,471, 3,514,530, 3,501,331, 3,631,064, 3,097,540, 3,681,392, 3,663,571, etc. Specific examples of suitable color formers are triarylmethane compounds such as 3,3-bis(p-dimethylaminophenyl)-6-dimethylaminophthalide (or Crystal Violet Lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethyaminophthalide, 3,3-bis(9-ethylcarbazol-3-yl)-5-dimethylaminophthalide, 3,3-bis(2-phenylindol-3-yl)-5-dimethylaminophthalide and 3-p-dimethylaminophenyl-3-(1-methylpyrrol-2-yl)-6-dimethylaminophthalide; diphenylmethane compounds such as 4,4'-bis-dimethylaminobenzhydrin benzylether, N-halophenylleucoauramine and N-2,4,5-trichlorophenylleucoauramine; xanthene compounds such as Rhodamine B-anilinolactam, Rhodamine B-p-nitroanilinolactam, Rhodamine B-p-chloroanilinolactam, 3-dimethylamino-7-methoxyfluoran, 3-diethylamino-7-methoxyfluoran, 3-diethylamino-6-methoxyfluoran, 3-diethylamino-7-chlorofluoran, 3-diethylamino-7-chloro-6-methylfluoran, 3-diethylamino-6,8-dimethylfluoran, 3-diethylamino-7-acetylmethylaminofluoran, 3-diethylamino-7-methylaminofluoran, 3,7-diethylaminofluoran, 3-diethylamino-7-dibenzylaminofluoran, 3-diethylamino-7-methylbenzylaminofluoran, 3-diethylamino-7-phenylamino-6-methylfluoran, 3-diethylamino-7-chloroethylmethylaminofluoran and 3-diethylamino-7-dichloroethylaminofluoran; thiazine compounds such as benzoyl leucomethylene blue and p-nitrobenzyl leucomethylene blue; spiro compounds such as 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxy-benzo)-spiro-pyran and 3-propyl-spiro-dibenzopyran; and mixtures of these compounds.

The color former is dissolved in a solvent and encapsulated or dispersed in a binder solution and coated on a support. Suitable color former solvents are natural or synthetic oils which can be used individually or as combinations. Examples of specific solvents which can be used in this invention are cotton seed oil, kerosene, paraffins, naphthalene oils, alkylated biphenyls, alkylated terphenyls, chlorinated paraffins and alkylated naphthalenes. The encapsulation can be carried out according to conventional methods such as a method utilizing coacervation of a hydrophilic colloid sol as described, for example, in U.S. Pat. Nos. 2,800,457 and 2,800,458, or an interfacial polymerization method as described, for example, in British Pat. Nos. 867,797, 950,443, 989,264 and 1,091,076. A suitable concentration of the color former in the solvent can range from about 0.1 to about 50% by weight and a suitable coating amount for the microcapsules is about 0.5 to about 20 $g/m^2$.

The effect of recording sheets of this invention was demonstrated using the following color former sheet.

Color former containing microcapsules were prepared in a conventional method, for example, as described in U.S. Pat. No. 2,800,457, according to the procedures described below. All parts, percents ratios and the like are by weight, unless otherwise indicated.

10 parts of acid treated pig skin gelatin and 10 parts of gum arabic were dissolved in 400 parts of water at 40° C., 0.2 part of Turkey red oil was added as an emulsifier, and 40 parts of color developer oil were emulsified and dispersed. The color developer oil was prepared by dissolving 2% of Crystal Violet Lactone in diisopropyl naphthalene.

When the size of the oil droplets reached 5μ on the average, the emulsification was stopped, and water at 40° C. was added to make the total volume 900 parts and the total amount was continuously stirred. While stirring, the temperature of the liquid was not allowed to decrease below 40° C. Next, 10% acetic acid was added to adjust the pH of the liquid to 4.0 to 4.2 whereby coacervation occurred.

The stirring was further continued, and after 20 minutes, the entire system was cooled with ice water to gel the coacervate film deposited around the oil droplets.

When the temperature of the liquid was 20° C., 7 parts of a 37% formaldehyde aqueous solution was added. At 10° C., a 15% sodium hydroxide aqueous solution was tested to make the pH 9. Afterwards, the liquid was heated for 20 minutes with stirring, to increase the temperature thereof to 50° C. After the thus prepared microcapsule dispersion was cooled to 30° C., the dispersion was coated on paper (weighing 40 $g/m^2$) in an amount of 6 $g/m^2$ (coated solids) and dried. In this way, a microcapsule sheet containing Crystal Violet Lactone as a color former was obtained.

The following Examples are given to illustrate the invention in greater detail but the invention is not to be construed as being limited to these Examples.

EXAMPLE 1

10 parts of p-isopropenyl phenol dimer synthesized using the method described in Japanese patent Application (OPI) No. 30852/75 and 3 parts of ethyl cellulose were dissolved in 50 parts of ethanol and 20 parts of kaolin were dispersed in the resulting solution. Then, this dispersion was coated on a paper (weighing 50 $g/m^2$) with a coating rod and dried, the amount of coated solids being 5 $g/m^2$, to obtain a coated paper according to this invention.

COMPARATIVE EXAMPLE 1

Another coated paper for comparison was prepared in a similar manner to Example 1, except that kaolin was not used, 1 part of ethyl cellulose was used and the coated amount was 2 $g/m^2$.

EXAMPLE 2

40 Parts of 2-(p-hydroxyphenyl)-2-butene dimer obtained in a manner similar to Example 1 and 6 parts of naphthalene sulfonic acid-formaldehyde condensation product were milled in a ball-mill for one day together with 54 parts of water. Next, 100 parts of the resulting dimer dispersion and 160 parts of kaolin and, as a binder, 80 parts of a styrene-butadiene copolymer latex (solids content 50%) were mixed with 500 parts of water and well stirred and admixed to obtain a coating solution for use in this invention. This was coated on a paper (weighing 50 $g/m^2$) with a coating rod and dried, the amount of coated solids being 6 $g/m^2$.

COMPARATIVE EXAMPLE 2

Another coated paper for comparison was prepared in a manner similar to Example 2, except that kaolin was not used, 16 parts of a styrene-butadiene copolymer latex were used and the coated amount was 2 $g/m^2$.

EXAMPLE 3

40 Parts of p-isopropenyl phenol dimer as described in Example 1, 5 parts of sodium caseinate and 1 part of Turkey red oil were milled in a ball-mill for one day together with 54 parts of water. Next, 100 parts of the thus prepared dimer dispersion, 160 parts of kaolin and 10 parts of magnesium oxide and, as a binder, 80 parts of a styrene-butadiene copolymer latex were mixed with 500 parts of water and well stirred and admixed to obtain a coating solution for use in this invention. This was coated on a paper (weighing 50 $g/m^2$) with a coating rod and dried, the amount of coated solids being 6 $g/m^2$.

COMPARATIVE EXAMPLE 3

To 100 parts of p-isopropenyl phenol dimer dispersion obtained as in Example 3, 16 parts of a styrene-butadiene copolymer latex and 50 parts of water were added and well stirred and admixed to obtain another coating solution for comparison. This was coated on a paper (weighing 50 g/m$^2$) with a coating rod and dried, the amount of coated solids being 2 g/m$^2$.

EXAMPLE 4

2 g of sodium hydroxide was dissolved in 500 parts of water and 200 parts of terra alba and 50 parts of kaolin were added and well stirred, and then 10 parts of magnesium oxide, 100 parts of p-isopropenyl phenol dimer dispersion obtained as in Example 3 and 100 parts of a styrene-butadiene copolymer latex were added to obtain a coating solution for use in this invention. This solution was coated on a paper (weighing 50 g/m$^2$) with a coating rod and dried, the amount of coated solids being 6 g/m$^2$.

EXAMPLE 5

To 100 parts of p-isopropenyl phenol dimer dispersion obtained as in Example 3, 5 parts of magnesium oxide and, as a binder, 20 parts of a styrene-butadiene copolymer latex and 50 parts of water were added and well stirred and admixed to obtain a coating solution for use in this invention. This solution was coated on a paper (weighing 50 g/m$^2$) with a coating rod and dried, the amount of coated solids being 2 g/m$^2$.

COMPARATIVE TESTING

The Crystal Violet Lactone containing capsule coated sheet produced as described above was placed on each coated paper prepared in the above Examples and Comparative Examples, and pressed using a pressure of 600 kg/cm$^2$ for coloration. After one day, the developed color density was measured with a spectrophotometer. This is the fresh density. Next, the developed color image was exposed to sunlight for one hour, and afterwards, the density thereof was measured with a spectrophotometer. The wavelength for the measurement was 610 mμ.

The results obtained are shown in the Table 1 below.

TABLE 1

| Example No. | Fresh Density | Density after One Hour Sunlight Exposure |
|---|---|---|
| Example 1 | 0.72 | 0.65 |
| Comparative Example 1 | 0.58 | 0.44 |
| Example 2 | 0.78 | 0.69 |
| Comparative Example 2 | 0.61 | 0.43 |
| Example 3 | 0.85 | 0.79 |
| Comparative Example 3 | 0.63 | 0.47 |
| Example 4 | 0.92 | 0.87 |
| Example 5 | 0.76 | 0.69 |

The above results show that excellent color developer sheets can be obtained according to the present invention.

EXAMPLE 6

10 Parts of the color developer shown in the Table 2 below and 3 parts of ethyl cellulose were dissolved in 50 parts of ethanol, and 20 parts of kaolin were dispersed in the resulting solution. The thus prepared coating solution was coated on a paper of high quality (weighing 50 g/m$^2$) with a coating rod and dried, the amount of coated solids being 5 g/m$^2$, to obtain a color developer sheet of this invention.

EXAMPLE 7

40 Parts of a color developer shown in the Table 2 below and 6 parts of a naphthalene sulfonic acid-formaldehyde condensation product were milled in ball-mill for one day together with 54 parts of water. Next, 100 parts of the thus prepared dimer dispersion and 160 parts of kaolin and, as a binder, 80 parts of a styrene-butadiene copolymer latex (solids content 50%) were mixed with 500 parts of water and well stirred and admixed to obtain a coating solution for use in this invention. This was coated on a paper (weighing 50 g/m$^2$) with a coating rod and dried, the amount of coated solids being 6 g/m$^2$, to obtain a color developer sheet of this invention.

EXAMPLE 4A AND COMPARATIVE EXAMPLE 5

Color developer sheets were prepared in a manner similar to Example 6, except that different compounds shown in Table 2 below were used.

COMPARATIVE EXAMPLES 6 AND 7

Comparative color developer sheets were prepared in a manner similar to Example 7, except that different compounds shown in Table 2 below were used.

The physical data for the color developer sheets prepared in the above Examples and Comparative Examples are shown in Table 2 below.

TESTING METHOD

The properties of color developer sheets prepared in the above Examples and Comparative Examples were tested as follows:

Developability

Each color developer sheet was placed on the Crystal Violet Lactone containing capsule sheet prepared as described above and pressed at a pressure of 600 kg/cm$^2$ for coloration. After the paper was left for one day in a dark place, the density at 610 mμ was measured with a Toshiba Beckman DB-type Spectrophotometer.

Light Resistance

After the developed color image obtained as described above was exposed to ultraviolet light for one hour with an Atlas Fade-O-Meter, the density of the image was measured and the light resistance was calculated according to the following formula:

$$\text{Light Resistance (\%)} = \frac{\text{Density at 610 m}\mu\text{ after UV Irradiation}}{\text{Density at 610 m}\mu\text{ before UV Irradiation}} \times 100$$

Moisture Resistance

After each recording sheet was left in an atmosphere of relative humidity (RH) = 90% and temperature = 50° C. for 24 hours, the sheet was treated in the same way as described above to obtain a developed color image and the density of the image was measured in a similar manner. The moisture resistance is calculated according to the following formula:

$$\text{Moisture Resistance (\%)} = \frac{\text{Developability after Moisture Resistance Test}}{\text{Developability before Moisture Resistance Test}} \times 100$$

TABLE 2

| Example No. | Color Developer | Developed Color Density | Light Resistance (%) | Moisture Resistance (%) |
|---|---|---|---|---|
| Example 6 | 6:4 Mixture of 2-(p-hydroxyphenyl)-2-pentene dimer and p-phenylphenol-formaldehyde polymer (polymerization degree: about 3) | 0.80 | 82.9 | 81.2 |
| Example 7 | 5:4 Mixture of 2-(o-isopropyl-p-hydroxyphenyl)-2-butene dimer and p-chlorophenol-formaldehyde polymer (polymerization degree: about 4) | 0.81 | 80.1 | 82.6 |
| Example 4A | 2-(p-Hydroxyphenyl)-2-pentene dimer | 0.71 | 65.2 | 60.9 |
| Comparative Example 5 | p-Phenylphenol-formaldehyde polymer | 0.73 | 63.4 | 69.7 |
| Comparative Example 6 | 2-(o-Isopropyl-p-hydroxyphenyl)-2-butene dimer | 0.70 | 62.2 | 61.6 |
| Comparative Example 7 | p-Chlorophenol-formaldehyde polymer | 0.69 | 67.9 | 65.7 |

The mixture ratio set forth in Table 2 above is by weight (hereinafter the same).

As is apparent from the results shown in Table 2 above, the developability, the light resistance and the moisture resistance of the color developer sheets of this invention are excellent. Thus, the combined use of an alkenyl phenol dimer and a phenol resin in a color developer layer improves greatly the developability, the light resistance and the moisture resistance of color developer sheets as compared with the use of the alkenyl phenol dimer or the phenol resin alone.

EXAMPLE 8

10 Parts of the color developer shown in Table 3 below and 3 parts of ethyl cellulose were dissolved in 50 parts of ethanol and 20 parts of kaolin were dispersed in the resulting solution. The thus prepared coating solution was coated on a paper of high quality (weighing 50 $g/m^2$) with a coating rod and dried, the amount of coated solids being 5 $g/m^2$, to obtain a color developer sheet of this invention.

EXAMPLE 9

40 Parts of the color developer shown in Table 3 below and 6 parts of naphthalene sulfonic acid-formaldehyde condensation product were milled in a ball-mill for one day together with 54 parts of water. Next, 100 parts of the resulting dimer dispersion and 160 parts of kaolin and, as a binder, 80 parts of a styrene-butadiene copolymer latex (solids content 50%) were mixed with 500 parts of water and well stirred and admixed to prepare a coating solution for use in this invention. This was coated on a paper (weighing 50 $g/m^2$) with coating rod and dried, the amount of coated solids being 6 $g/m^2$, to obtain a color developer sheet of this invention.

COMPARATIVE EXAMPLES 8 AND 9

Comparative color developer sheets were prepared in a manner similar to Example 8, except that the compounds shown in Table 3 below were used.

COMPARATIVE EXAMPLES 10 AND 11

Comparative color developer sheets were prepared in a manner similar to Example 9, except that the compounds shown in Table 3 below were used.

The physical data on the color developer sheets prepared in the above Examples and Comparative Examples are shown in Table 3 below. The test method used was the same as described for Examples 6 and 7.

TABLE 3

| Example No. | Color Developer | Developed Color Density | Light Resistance (%) | Moisture Resistance (%) |
|---|---|---|---|---|
| Example 8 | 7:3 Mixture of p-isopropenyl phenol dimer and zinc 3,5-di-tert-butyl salicylate | 0.81 | 81.2 | 80.6 |
| Example 9 | 8:2 Mixture of 2-(p-hydroxyphenyl)-2-butene dimer and aluminum 3-phenyl-5-(2,2-dimethylbenzyl) salicylate | 0.80 | 79.6 | 88.3 |
| Comparative Example 8 | p-Isopropenylphenol dimer | 0.70 | 67.5 | 64.1 |
| Comparative Example 9 | Zinc 3,5-di-tert-butyl salicylate | 0.71 | 69.2 | 67.2 |
| Comparative Example 10 | 2-(p-Hydroxyphenyl)-2-butene dimer | 0.71 | 63.2 | 60.8 |
| Comparative Example 11 | Alumimum 3-phenyl-5-(2,2-dimethylbenzyl) salicylate | 0.70 | 70.8 | 75.2 |

As is apparent from the results shown in Table 3 above, the developability, the light resistance and the moisture resistance of the color developer sheets of this invention are excellent. Thus, the combined use of an alkenyl phenol dimer and an aromatic carboxylic acid metal salt in a color developer layer greatly improved the developability, the light resistance and the moisture resistance of color developer sheets as compared with the use of the alkenyl phenol dimer or the aromatic carboxylic acid metal salt alone.

From the above results, it can be seen that the color developer sheets of this invention are extremely useful.

EXAMPLES 10-18

40 Parts of p-isopropenyl phenol dimer synthesized according to Japanese patent Application (OPI) No. 30852/75 and 2 parts of the surface active agent as shown in Table 4 below were milled in a ball-mill for one day together with 58 parts of water.

Next, 100 parts of the resulting dimer dispersion and 160 parts of kaolin and, as a binder, 80 parts of a styrene-butadiene copolymer latex (solids content 50%) were mixed with 500 parts of water and well stirred and admixed to prepare a coating solution for use in this invention. This was coated on a paper (weighing 50 $g/m^2$) with a coating rod and dried, the amount of coated solids being 6 $g/m^2$.

COMPARATIVE EXAMPLE 12

Another color developer sheet for comparison was prepared in a manner similar to Example 10, except that a surface active agent was not used.

EXAMPLE 19

A color developer sheet was prepared in a manner similar to Example 10, except that 2-(p-hydroxyphenyl)-2-pentene dimer was used in place of p-isopropenyl phenol dimer.

COMPARATIVE EXAMPLE 13

Another color developer sheet for comparison was prepared in a manner similar to Example 19, except that no surface active agent was used.

EXAMPLE 20

25 Parts of p-isopropenyl phenol dimer were dissolved in 200 parts of a 10% sodium hydroxide solution, and 50 parts of activated clay were added and vigorously stirred. To the thus prepared dispersion, 30 parts of a styrene-butadiene copolymer latex (solids content 50%) were added and 2 parts of a naphthalene sodium sulfonate-formaldehyde condensation product were added and the entire amount was well stirred to obtain a coating solution. The thus prepared coating solution was coated and dried on a stencil paper in a manner similar to Example 10.

COMPARATIVE EXAMPLE 14

Another color developer sheet for comparison was prepared in a manner similar to Example 20, except that no surface active agent was used.

COMPARATIVE TESTING

A microcapsule sheet containing Crystal Violet Lactone or 3-benzylamino-7-diethylaminofluoran was placed on each color developer coated sheet prepared in Examples 10–20 and Comparative Examples 12–14, and pressed at a pressure of 600 $kg/cm^2$ for coloration.

After allowing the sheet to stand in a dark place for one full day, the reflection spectrum in the wavelength range of 380–700 mμ was measured with a Beckman Spectrophotometer DB Type. The developed color density (= absorbance at the absorption maximum of the color former) is shown in Table 4 below.

The viscosity of each coating solution of Examples 10 to 20 and Comparative Examples 12 to 14 was measured and is also shown in Table 4 below. The viscosity was measured with a BL Type Viscometer (60 rpm).

TABLE 4

| Example No. | Surface Active Agent | Viscosity of Coating Solution (cp) | Developed Color Density of Crystal Violet Lactone (610 mμ) | Developed Color Density of 3-Benzylamino-7-diethylamino-fluoran (600 mμ) |
|---|---|---|---|---|
| Example 10 | Sodium alkyl-benzene sulfonate | 6.4 | 1.01 | 0.76 |
| Example 11 | Sodium higher alcohol sulfate | 7.2 | 0.97 | 0.72 |
| Example 12 | Sodium alkyl sulfonate | 7.6 | 0.98 | 0.73 |
| Example 13 | Sodium naphthalene sulfonate-formaldehyde condensation product | 10.3 | 1.02 | 0.76 |
| Example 14 | Dialkyl phosphate | 15.1 | 0.89 | 0.69 |
| Example 15 | Sodium polyoxyethylene-alkyl sulfonate | 22.3 | 0.93 | 0.75 |
| Example 16 | Sodium dialkylsulfosuccinate | 14.3 | 0.88 | 0.70 |
| Example 17 | Turkey red oil | 15.0 | 0.79 | 0.68 |
| Example 18 | Alkylphenol-ethylene oxide adduct | 32.0 | 0.81 | 0.71 |
| Comparative Example 12 | — | 46.0 | 0.77 | 0.63 |
| Example 19 | Sodium alkylbenzene sulfonate | 9.8 | 0,87 | 0.71 |
| Comparative Example 13 | — | 49.6 | 0.67 | 0.59 |
| Example 20 | Sodium naphthalene sulfonate-formaldehyde condensation product | 4.2 | 0.86 | 0.72 |
| Comparative Example 14 | — | 27.0 | 0.84 | 0.70 |

The surface active agents used in Examples 10 to 20 were as follows:

- Sodium alkylbenzene sulfonate: Neogen Powder (trade name of Dai-ichi Kogyo Seiyaku Co., Ltd., Japan)
- Sodium higher alcohol sulfate: Morogan 170 (trade name of Dai-ichi Kogyo Seiyaku Co., Ltd., Japan)
- Sodium naphthalene sulfonate-formaldehyde condensation product: Raberin (trade name of Dai-ichi Kogyo Seiyaku Co., Ltd., Japan)
- Dialkyl phosphate: Elenon No. 19M (trade name of Dai-ichi Kogyo Seiyaku Co., Ltd., Japan)
- Sodium polyoxyethylene alkylsulfonate: Hitenol 183 (trade name of Dai-ichi Kogyo Seiyaku Co., Ltd., Japan)
- Sodium dialkylsuccinate: Neocol SW (trade name of Dai-ichi Kogyo Seiyaku Co., Ltd., Japan)
- Turkey red oil: Turkey red oil (made by of Dai-ichi Kogyo Seiyaku Co., Ltd., Japan)
- Alkyl phenol-ethylene oxide adduct: Noigen EA 80 (trade name of Dai-ichi Kogyo Seiyaku Co., Ltd., Japan)

In addition, it was confirmed that the film surface strength was greatly improved by the addition of the surface active agent, and the other necessary properties such as light resistance and moisture resistance of the developed color image were also good.

From the results set forth in the above comparative tests, it can be seen that recording sheets having improved film surface strength and developability can be obtained according to the present invention. In addition, the viscosity of the coating solution used in this invention can be kept low, which brings about a great advantage in the manufacture of products, for example, a reduction in the cost of manufacture.

While the invention has been described in detail and with reference to specific embodiments thereof, it will be apparent to one skilled in the art that various changes and modifications can be made therein without departing from the spirit and scope thereof.

What is claimed is:

1. A recording sheet comprising a support having thereon a layer of a color developer capable of forming a developed color image in the presence of a color former wherein said layer of said color developer contains (1) a dimer of a compound of the formula (I):

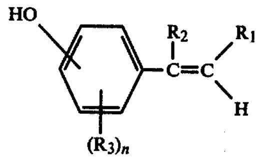

(I)

wherein $R_1$, $R_2$ and $R_3$, which may be the same or different, each represents a hydrogen atom, an alkyl group, an aryl group or an aralkyl group, and n is an integer of 1 to 4, as a color developer; and (2) an oil adsorptive inorganic pigment, wherein said layer of said color developer further contains at least one of a phenol resin and a metal salt of an aromatic carboxylic acid.

2. The recording sheet as claimed in claim 1, wherein said layer of said color developer further contains a surface active agent.

3. The recording sheet as claimed in claim 1, wherein said compound of the formula (I) is p-isopropenyl phenol, 2-(p-hydroxyphenyl)-2-butene, 2-(p-hydroxyphenyl)-2-pentene, α-(p-hydroxyphenyl)styrene, 1-(p-hydroxyphenyl)-1-isobutene, p-cyclohexenylphenol, 2-(p-hydroxyphenyl)-3-methyl-2-butene, 2-(p-hydroxyphenyl)-2-hexene, 2-(p-hydroxyphenyl)-2-hexadecene, m-methyl-p-isopropenyl phenol, 2-(o-isopropyl-p-hydroxyphenyl)-2-butene, 2-(o-phenyl-p-hydroxyphenyl)-2-pentene, 2-(o-tert-butyl-p-hydroxyphenyl)-2-pentene, m-isopropenylphenol or 1-(p-hydroxyphenyl)-1-propylene.

4. The recording sheet as claimed in claim 1, wherein said oil adsorptive inorganic pigment is a clay mineral, a metal oxide or a silicate other than clay.

5. The recording sheet as claimed in claim 1, wherein said oil adsorptive inorganic pigment is kaolin, talc, bentonite, terra alba, activated clay, agalmatolite, mica, zeolite, zinc oxide, titanium oxide, alumina, silicic acid anhydride, aluminum silicate or zinc silicate.

6. The recording sheet as claimed in claim 1, wherein the proportion of the oil adsorptive inorganic pigment ranges from about 10 to 100,000 parts by weight per 100 parts by weight of said dimer compound of the formula (I).

7. The recording sheet as claimed in claim 1, wherein the amount of dimer present in said color developer is about 70 to 90% by weight of the amount of monomer, trimer or higher oligomers.

8. The recording sheet as claimed in claim 1, wherein said compound of formula (I) is selected from the group consisting of p-isopropenyl-phenol, 2-(p-hydroxyphenyl)-2-butene, 2-(p-hydroxyphenyl)-2-pentene, α-(p-hydroxyphenyl)styrene, 1-(p-hydroxyphenyl)-1-isobutene, p-cyclohexenylphenol, 2-(p-hydroxyphenyl)-3-methyl-2-butene, 2-(p-hydroxyphenyl)-2-hexene, 2-(p-hydroxyphenyl)-2-hexadecene, m-methyl-p-isopropenyl-phenol, 2-(o-isopropyl-p-hydroxyphenyl)-2-butene, 2-(o-phenyl-p-hydroxyphenyl)-2-pentene, 2-(o-tert-butyl-p-hydroxyphenyl)-2-pentene, m-isopropenyl-phenol and 1-(p-hydroxyphenyl)-1-propylene.

9. The recording sheet as claimed in claim 1, wherein said recording sheet further contains a novolak phenol resin.

10. The recording sheet as claimed in claim 1, wherein said layer of said color developer further contains a basic compound selected from the group consisting of an alkali metal compound and an alkaline earth metal compound.

11. The recording sheet as claimed in claim 10, wherein said basic compound is selected from the group consisting of sodium hydroxide, potassium hydroxide, magnesium hydroxide, magnesium oxide, magnesium carbonate, calcium hydroxide and calcium carbonate.

12. The recording sheet as claimed in claim 11, wherein said basic compound is magnesium oxide.

13. The recording sheet as claimed in claim 1, wherein in said formula (I) said —OH group is in the m- or p-position to the

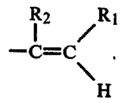

14. The recording sheet as claimed in claim 13, wherein said —OH group is in said p-position.

* * * * *